United States Patent [19]

Blount

[11] Patent Number: 5,093,416

[45] Date of Patent: Mar. 3, 1992

[54] PRODUCTION OF POLY (POLYISOCYANATE-ALKALI METAL SILICATE) PRODUCTS

[76] Inventor: David H. Blount, 6728 Del Cerro Blvd., San Diego, Calif. 92120

[21] Appl. No.: 101,845

[22] Filed: Sep. 28, 1987

[51] Int. Cl.⁵ .................. C08G 14/02; C08G 16/02
[52] U.S. Cl. .................................. 525/61; 525/454; 525/419; 525/471; 528/44; 528/84; 528/85
[58] Field of Search .................. 428/404; 528/44, 85, 528/84; 525/454, 419, 61, 471

Primary Examiner—Joseph L. Schofer
Assistant Examiner—Jeffrey T. Smith

[57] ABSTRACT

Poly(polyisocyanate-alkali metal silicate) products are produced by mixing and reacting an alkali metal silicate glass powder with a polyisocyanate compound and may be produced in the form of a pre-polymer, a solid or a cellular solid. These products may be used as flame-resistant, sound and thermal insulation, as a coating agent and for filling cracks and cavities.

9 Claims, No Drawings

PRODUCTION OF POLY (POLYISOCYANATE-ALKALI METAL SILICATE) PRODUCTS

BACKGROUND OF THE INVENTION

This invention relates to a process for the production of poly(polyisocyanate-alkali metal silicate) products by reacting an isocyanate compound containing 2 or more isocyanate radicals and powdered alkali metal silicate glass.

The products produced by this process may be quite varied in physical properties; they may be pre-polymers, solids, porous, rigid or elastomine, and the porous products may be rigid or soft and flexible and be an improvement over previously produced polyisocyanate-alkali metal silicate products.

It is known in the Arts that polyisocyanates with aqueous sodium silicate and/or polysilicic acid will react to produce products. The process of this invention has an advantage over previous processes in that no other compound such as water, amine catalyst, organic tin catalyst other organic compounds, etc., are not necessary to produce good foamed products. Another advantage is that alkai metal silicates that contain much less alkali metal oxide radical and are not water-soluble may be used in this process, thereby lowering the cost of the alkali metal silicate component. Another advantage is that the use of alkali metal silicate glass with low amounts of alkali metal oxide radicals improves the physical properties of the foamed results produced by decreasing or eliminating the tendency of foams which contain large amounts of the alkali metal oxide to absorb moisture from the atmosphere. Another improvement is that when aqueous alkali metal silicate solutions or hydrated alkali metal silicates are reacted with polyisocyanates, the water present reacts first with the polyisocyanate, thereby producing a different foamed product containing polysilicic acid. When an excess of water is present, the polysilicic acid reacts only with the water and does not react with the silicate radical, but instead, the polyisocyanate-water reaction produces carbon dioxide which reacts with the alkali metal silicate compound to produce polysilicic acid and alkali metal carbonate. When polyisocyanate is mixed with a powdered alkali metal silicate glass, the chemical reaction is catalyzed by the alkali metal oxide radical and the polyisocyanate radical reacts with the alkali metal silicate, therby giving off carbon dioxide which reacts with some of the alkali metal oxide radical to produce alkali metal carbon and producing a foamed poly(polyisocyanate-alkali metal silicate) product. The exact chemical reaction that takes place is not known.

SUMMARY OF THE INVENTION

I have discovered that poly (poly isocyanate-alkali metal silicate products having novel properties may be prepared by reacting finely powdered alkali metal silicate glass with a polyisocyanate compound. The chemical reaction is promoted by heating the mixture to a temperature range of about 20° to 80°. The products may be produced in the form of a pre-polymer by using an excess amount of polyisocyanate, in form of a solid or in the form of a self-standing cellular solid by heating the mixture to about 20° to 8° C. The poly (polyisocyanate-alkali metal silicate) prepolymer may be further reacted with a compound that contains at least one active hydrogen that will react with the isocyanate radical to produce solid or foamed products.

The self-standing poly(polyisocyanate-alkali metal silicate) cellular solid is somewhat brittle and only has fair strength when under pressure. The mechanical properties can be greatly improved by a cross-linking agent such as a compound that contains two or more active hydrogens that will react with the isocyanate radical or silicate radical, a modifying organic polymers which will react with isocyanate radicals, polymerable unsaturated compound e.g. vinyl monomers, diene monomers, etc.

The components of this invention may be reacted under any suitable physical condition. Usually ambient temperature and pressure are satisfactory, but in certain cases, elevated or lowered pressure is desirable. The component may be mixed by any satisfactory means. The components may be added simultaneously or separately. The preferred method is to mix the components simultaneously at a temperature between 20° and 80° at ambient pressure.

DETAILED DESCRIPTION OF THE INVENTION

Poly(polyisocyanate-alkali metal silicate,1products may be may be produced by mixing and reacting the following Components:

A. A finely powdered alkali silicate glass.
B. A compound containing 2 or more isocyanate radicals.

Component A

Alkali metal silicate glass may be produced by any of the commonly known methods such as melting sand and an alkali metal oxide, hydroxide, carbonate, sulfate or mixtures thereof together until an alkali metal silicate is formed. The $SiO_2$:alkali metal oxide ratio may be greatly varied, preferrably in the range of 1:1 to 10:1. It is not necessary for the alkali metal silicate to be water soluble. It is desirable to use the powdered glass which has a high ratio of $SiO_2$. Crude commercial alkali metal Silicate glass may contain additional substances such as calcium silicate, magnesium silicate, borates, and aluminates may also be used. The alkali metal silicate glass if preferred to be in the form of a fine powder that will go through 65-mesh screen or, preferrably, small particles that will pass through a 200-mesh or a 300-mesh screen.

Component B

Any suitable compound that contains at least 2 isocyanate groups may be used in this invention.

Any suitable organic polyisocyanate may be used as starting Component B, including aliphatic, cycloaliphatic, araliphatic, aromatic or heterocyclic polyisocyanates of the kind described, e.g., by W. Siefken in Justus Liebigs Annalen der Chemie, 562, pages 75 to 136, for example ethylene diisocyanate, tetramethylene-1,4-diisocyanate, hexamethylene-1,6-diisocyanate, dodecane-1,12, diisocyanate, cyclobutane-1,3-diisocyanate, cyclohexane-1,3-and 1,4-diisocyanate and any mixtures of these isomers, 1-isocyanato-3.3.5-trimethyl-5-isocyanatomethylcyclohexane (DAS No. 1,202,785), hexahydrotolylene-2,4- and -2,6-diisocyanate and any mixtures of these isomers, hexahydrophenylene 1,3- and/or -1,4-diisocyanate, perhydrodiphenylmethane-2,4'- and/or 4,4'-diisocyanate, phenyl-1,3 and 1,4- diisocyanate, tolylene-2,4- and -2,6-diisocyanate and any mixtures of these isomers, diphenylmethane 2,4'- and/or -4,4'-diisocyanate, naphthylene-1,5-diisocyanate, triphenylmethane-4,4',4"-triisocyanate, polyphenyl-polymethylene-polyisocyanates, which can be obtained by aniline-formaldehyde condensation followed by phosgenation and which have been described, e.g., in British patent specification Nos. 874,430 and 848,671, perchlorinated aryl polyisocyanates as described, e.g., in U.S. Pat. No. 3,277,138, polyisocyanates which contain carbodiimide groups as described in U.S. Pat. No. 3,152,162, diisocyanates of the kind described in U.S. Pat. No. 3,492,330, polyisocyanates which contain allophanate groups as described, e.g., in British patent specification No. 994,890, Belgian patent specification No. 761,626 and published Dutch patent application No. 7,102,524, polyisocyanates which contain isouranate groups as described, e.g., in German patent specification Nos. 1,022,789; 1,122,067 and 1,027,394 and in German Offenlegungsschrift Nos. 1,929,034 and 2,004,048, polyisocyanates which contain urethane groups as described, e.g., in Belgian patent specification No. 752,261 or in U.S. Pat. No. 3,392,164, polyisocyanates which contain acylated urea groups according to U.S. Pat. No. 3,517,039, polyisocyanates which contain biuret groups as described, e.g., in U.S. Pat. No. 3,124,605, in British patent specification No. 889,050 and in U.S. patent application Ser. No. 036,500 filed May 11, 1970, now abandoned, polyisocyanates prepared by telomerization reactions as described, e.g., in Belgian patent specification No. 723,640, polyisocyanates which contain ester groups of the kind mentioned, e.g., in British patent specification Nos. 956,474 and 1,072,956, in U.S. Pat. No. 3,567,763 and in German patent specification No. 1,231,688, and reaction products of the above-mentioned isocyanates with acetals according to U.S. Pat. No. 3,120,502.

The distillation residues which are obtained from the commercial production of isocyanates and which still contain isocyanate groups may also be used, if desired, dissolved in one or more of the above-mentioned polyisocyanates. Any mixtures of the above-mentioned polyisocyanates may also be used.

It is generally preferred to use commercially readily available polyisocyanates such as tolylene-2,4- and -02,6-diisocyanate and any mixtures of these isomers ("TDI"), polyphenyl-polymethylene polyisocyanates which are obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

It is particularly preferred, however, to use polyisocyanates which are obtained by phosgenating aniline-formaldehyde concensates.

Reaction products of about 50 to 99 mols of aromatic diisocyanates with about 1 to 50 mols of compounds which contain at least 2 hydrogen atoms capable of reacting with isocyanate and which generally have a molecular weight of about 400 to about 10,000 may also be used.

The poly(polyisocyanate-alkali metal silicate product may be improved in its mechanical properties by the addition of a compound that will act as a linking agent. Compounds which will react with the isocyanate radical and/or the silicate radical or will be polymerized by chemical reaction of the components may be used as linking or re-enforcing agents.

Any suitable compound that contains at least one active hydrogen, preferably 2 or more active hydrogen-containing compounds, that will react with isocyanate radical may be used in this invention.

The organic compounds having reactive hydrogens are understood to be not only compounds which contain amino groups, thiol groups or carboxyl groups, but particularly also polyhydroxyl compounds and especially those which contain two to eight hydroxyl groups and which have a molecular weight of about 800 to about 10,000, preferably about 1,000 to about 6,000, e.g., polyesters, polyethers, polythioethers, polyacetals, polycarbonates and polyester amides which contain at least 2, generally 2 to 8 and preferably 2 to 4 hydroxyl groups and at least one ionic or non-ionic hydrophilic group, of the kind which are known per se, for producing both homogeneous and cellular polyurethanes.

Any suitable polyesters with at least one hydroxyl group may be used, including, e.g., reaction products of polyhydric, preferably dihydric alcohols with the optional addition of trihydric alcohols, and polybasic, preferably dibasic carboxylic acids. Instead of free polycarboxylic acids, the corresponding polycarboxylic acid anhydrides or corresponding polycarboxylic acid esters of lower alcohols or their mixtures may be used for producing the polyesters. The polycarboxylic acids may be aliphatic, cycloaliphatic, aromatic and/or heterocyclic and may be substituted, e.g., with halogen atoms, and/or unsaturated. The following are examples: succinic acid, adipic acid, suberic acid, azelaic acid, sebasic acid, phthalic acid, isophthalic acid, trimellitic acid, phthalic anhydride, tetrahydrophthalic acid anhydride, hexahydrophthalic acid anhydride, tetrachlorophthalic acid anhydride, indomethylene terrahydrophthalic acid anhydride, glutaric acid anhydride, maleic acid, maleic acid anhydride, fumaric acid, simeric and trimeric fatty acids such as oleic acid, optionally mixed with monomeric fatty acids, dimethyl terephthalate and bis-glycol terephthalate. Suitable polyhydric alcohols include, e.g., ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis hydroxy-methyl cyclohexane). 2-methyl-1,3-propanediol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl groups in end positions. Polyesters of lactones such as $\xi$-caprolactone or hydroxycarboxylic acids such as $\omega$-hydroxycaproic acid may also be used.

Any suitable hydroxyl polyether with at least one, generally two to eight and preferably two to three hydroxyl groups which may be used according to the invention are also known, per se, and may be prepared, e.g., by polymerizing epoxides such as ethylene oxide, propylene oxide, butylene oxide, tetrahydrofuran, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol, propylene glycol, propylene glycol-(1,3) or (1,2), trimethylolpropane, 4,4'-dihydroxy-diphenylpropane, aniline, ammonia, ethanolamine, or ethylene diamine, Sucrose polyethers such as those described, e.g., in German Auslegeschrift Nos. 1,176,358 and 1,064,938 may also be used according to the invention. It is frequently preferred to use polyethers which contain predominantly primary OH-groups (up to 90% by weight, based on all the OH-groups in the polyether.). Polyethers modified with vinyl polymers of the kind which can be obtained, e.g., by polymerizing styrene or acrylonitrile in the presence of polyethers (U.S. Pat. Nos. 3,383,351; 3,304,273; 3,523,092 and 3,110,695 and German patent specification No. 1,152,536) and polybutadienes which contain OH-groups are also suitable.

Suitable polythioethers are, in particular, the condensation products of thiodiglycol with itself and/or with other glycols, dicarboxylic acids, formaldehyde, aminocarboxylic acids or amino alcohols. The products obtained are polythiomixed ethers, polythioether esters or polythioether ester amides, depending on the co-component.

Suitable polyacetals are, e.g., the compounds which can be prepared from glycols such as diethylene glycol, triethylene glycol, 4,4'-dioxethoxy-diphenyl dimethylmethane, hexanediol and formaldehyde; polyacetals suitable for the invention may also be prepared by polymerizing cyclic acetals.

Suitable polycarbonates with hydroxyl groups are of the kind known, per se, which can be obtained, e.g., by reacting diols such as propane-1,3-diol, butane 1,4-diol, butane-1,4-diol and/or hexane-1,6-diol or diethylene glycol, triethlene glycol or tetraethylene glycol with diaryl carbonates such as diphenyl carbonate or phosgene.

The polyester amides and polyamides also include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups may also be used, as well as modified or unmodified natural polyols such as castor oil, carbohydrates or starch. Additional products of alkylene oxides to phenol-formaldehyde resins or to urea-formaldehyde resins may also be used according to the invention.

Representatives of these compounds which may be used according to the invention have been described, e.g., in High Polymers, Volume XVI, "Polyurethanes, Chemistry and Technology", published by Saunders-Frisch, Interscience Publishers, New York, London, Volume I, 1962, pages 32-42 and pages 44-54 and Volume II, 1964, pages 5-6 and 198-199 and in Kunststoff-Handbuch VII, Vieweg-Hochtlen, Carl-Hanser-Verlag, Munich, 1966, e.g., on pages 45 to 71.

Silicone compounds which contain free hydroxyl or amine groups may be used in this invention, e.g., silicone polyols.

Organic amphiphilous compounds preferably contain from 1 to 9 carbon atoms, having a molecular weight of from 32 to about 400, preferably from 32 to 150, which contain one OH group and/or at least one other hydrophilic and/or polar group. This may be used in this invention. The other hydrophilic and/or polar group is preferably a functional group corresponding to one of the following inggeneral formulae: RSH, RCH$_2$, CL, RCH$_2$Br, RCH$_2$I, RCN, RNO$_2$, RCOCl, RCOBr, RSO$_2$Cl, RCOOH, RSO$_3$H, RCOO—, RSO$_3$—, ROR,

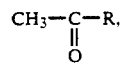

wherein R denotes a methyl, ethyl or propyl group. The organic amphilphilous compounds may contain an OH group and/or from 1 to 6, preferably 1 or 2 of these other functional groups.

The following are examples of amphiphilious compounds:

1. Alcohols, thioalcohols, phenols and thiophenols:
    methanol, ethanol, propanol, isopropanol, butanol, isobutanol, t-butyl alcohol, and the isomeric pentanols, hexanols and heptanols, cyclohexanol, methylcyclohexanol, allyl alcohol methallyl alcohol, cyclohexano-methanol, benzyl alcohol, butylmercaptan, phenols, e.g. phenol and the cresols, thiophenols and thiocresols. Alcohols with from 1 to 4 carbon atoms are preferred, particularly methanol.

2. Aldehydes:
    Formaldehyde, acetaldehyde, propionaldehyde, butyl aldehyde, pentanals, hexanals, heptanals, semi-acetals and full acetals.

3. Carboxylic acids:
    Formic acid, acetic acid, propionic acid, butyric acid, isobutyric acid, pentanoic acid, heptane carboxylic acid, cyclohexane carboxylic acid, benzoic acid, toluic acid.

4. Carboxylic acid chlorides, carboxylic acid bromides, sulphonic
    acid chlorides. Acetal chloride, propionic acid chloride, acetyl bromide, acid chlorides of C$_4$–C$_6$ monocarboxylic acids, but also methanesulphonic acid chloride, benzenesulphonic acid chloride, p-toluenesulphochloride, carbamic acid chlorides, e.g., t-butyl carbamic chloride, and phenylcarbamic chloride.

5. Esters:
    Methyl acetate, ethyl acetate, propylacitate, butyl acetate, amyl acetate, the methyl and ethyl esters of propionic, butyric, pentanoic, hexanoic and heptanoic acid and the corresponding isomeric compounds, for example, isobutyric acid, and 2,4,6-tribromophenylacetate.

6. Ethers and Thioethers:
    Methyl ethyl ether, cyclohexyl methyl ether, methyl butyl ether, phenol methyl ether, thiophenol methyl ether, 7. Halomethyl compounds.
    Ethyl chloride, ethyl bromide, ethyl iodide, n-propyliodide, isopropyl chloride, isopropyl bromide, isopropyl iodide, butyl chloride, butyl bromide, butyl iodide, C$_3$-C$_6$-halogenated methyl compounds, benzylhalides, e.g., benzylchloride or benzylbromide, hexahydrobenzyl halides, e.g., cyclohexaneomethyl chloride, epichlorohydrin, 2-ethyl-2-chloromethyloxetane and 2-ethyl-2-chloromethyloxetane. Halogenated methyl compounds which contain from 4 to 7 carbon atoms are preferred.

8. Ketones:
    Methyl ethyl ketone, methyl-isopropyl ketone, methylisobutyl-ketone, methyl-isoamyl ketone, methyl-n-propyl ketone, methyl-n-butyl ketone, methyltetrahydrofuranyl ketone, methyl-heptl ketone, ethylhexyl ketone, acetaphonone, chloroacetophenone and propiophenone.

9. Nitriles:
   Acetonitrile, propionitrile, butyronitrile, tolunitrile, hexahydrobenzonitrile, acrylonitrile, allylnitrile, methallylnitrile, methacrylonitrile.
10. Nitro compounds:
    Nitromethane, nitroethane, nitrohexane, nitrobenzene, chlorinated nitrobenzenes, nitro-cyclohexanes, brominated nitrobenzenes, benzyl nitrate and nitrotoluene.
11. Sulphonic acids.
    Methanesulphonic acid, ethanesulphonic acid, butanesulphonic acid, benzenesulphonic acid, 2-toluene sulphonic acid, 4-toluenesulphonic acid, chlorosulphonic acid esters and sulphonic acid esters, e.g., methanesulphonic acid methyl ester, methane sulphonic acid ethyl ester and chlorosulphonic acid methyl ester.
    The carboxyl acids and/or sulphonic acids may be partially or completely neutralized, for example with alkali metal and alkaline earth metal hydroxides, e.g., sodium hydroxide, potassium hydroxide, barium hydroxide, or magnesium hydroxide, or by the addition of amines, e.g., trimethylamine, triethylamine, methylmorpholine, pyridine, dimethylaniline, or metal alcoholates, e.g., sodium t-butaneolate or potassium isopropanolate. Metal oxides, hydroxides or carbonates, either in the solid form or suspended in diluents, may also be used for neutralization. Calcium oxide, magnesium oxide, calcium carbonate, magnesium carbonate and dolomite, for example, are particularly suitable. Tertiary amines are useful in this neutralization, e.g., alkoxylated products of primary and secondary amines, and also polyesters or polyacrylates which contain tertiary nitrogen atoms as well as the known condensation products based on epichlorohydrin and polyamines.
12. Components (C) according to this invention may also comprise:
    compounds which contain phosphorus, for example, trimethyl phosphite, trimethyl phosphates, triethylphosphite, triethyl phosphate, diethylphosphite, diethylphosphate, dimethyl phosphite, dimethylphosphate, thiophosphoric acid-O, O-dimethylester, thiophosphoric acid trimethylester, or theophosphoric acid-O, O-dimethyl ester chloride.
13. Lignin:
    Calcium lignosulfonic acid sodium salts, lignosulfonic acid sodium salts, lignosulfonic acid, lignin sulfate produced by the alkali process (Kraft's process) and particularly de-sulfonated lignin.

Any polymerizable unsaturated organic compound may be used in this invention that will polymerize in the presence of alkali metal silicate and polyisocyanates. Suitable free-radical initiator may be used with the polymerizable unsaturated organic compound. Suitable polymerizable unsaturated organic compounds such as vinyl monomers and diene monomers. Suitable vinyl monomers include, but are not limited to, styrene, acrylonitrile, acrylic compounds, vinyl acetate, vinyl pyrolidone, divinyl benzene, etc. Suitable diene monomers include, but are not limited to, isoprene and chloroprene. Unsaturated polyester resins may be used. Suitable free-radical initiators include, but are not limited to, inorganic peroxides, organic peroxides and alkali metal persulfates. The free-radical initiators are well known in the Arts. Initiators and promoters may be used with the free radical initiators. Redux systems may also be used with the free-radical initiators. The amount of free-radical initiators, initiator and promotors needed vary greatly with each type of free-radical initiator; only a catalytic amount is necessary.

Any suitable salt-forming compound may be used in this invention and added to Components A, B or a mixture of A and B. Suitable salt-forming compounds include, but are not limited to, organic acids, inorganic acids, carbon dioxide, organic esters, halogenated organic compounds, nitro organic compounds, ammonium chloride, calcium chloride, sulphonic acids, organic anhydrides, etc., and mixtures thereof.

The proportions of the reactants and other compounds used in this invention may very within the following ratios:
a) 10 to 200 parts by weight of Component A;
b) 50 to 100 parts by weight of Component B;,
c) up to 50 percent by weight of an inert blowing agent;
d) up to 10 percent by weight of a polyisocyanate activator,
(d) (cont.) initiator or catalyst;
(e) up to 20 percent by weight of a foam stabilizer;
(f) up to 20 percent by weight of an emulsifying agent;
(g) up to 300 percent by weight of inorganic or organic particulate or pulverulent material;
(h) up to a catalytic amount of a free-radical initiator;
(i) up to 300 percent by weight of a compound containing 1 or more active hydrogen atoms that will react with a polyisocyanate compound or a alkali metal silicate compound;
(j) up to 300 percent by weight of a modifying compound;
(k) up to 20 percent by weight of a salt-forming compound.

Percentages are based on the weight of Components A and B.

When producing foams by the process according to the invention, blowing agents may be used even when using NCO-prepolymers which give rise to the evolution of carbon dioxide. The blowing agents which are suitable for this purpose are inert liquids boiling within a range of $-25°$ C. to $80°$ C. and preferably, $-15°$ C. to $+40°$ C.

They are preferably insoluble in the silicate solution and they are used in quantities of 0–50 percent by weight, preferably 2–30 percent by weight, based on the reaction mixture.

Suitable organic blowing agents are, e.g., acetone, ethyl acetate, methanol, ethanol, halogen substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile may also act as blowing agents. Other examples of blowing agents and details concerning the use of blowing agents are described in Kunststoff Handbuch, Volume VII, published by Vieweg and Hochtlen, Carl-Hanser-Verlag, Munich 1966, e.g., on pages 108 and 109, 453 to 455 and 507 to 510.

Catalysts, initiators or activators, which promote the reaction of isocyanates with reactive hydrogen, are also often used according to the invention in catalytic amounts. Catalysts known, per se, may be used, e.g., tertiary amines such as trieyhylamine, tributylamine, N-methyl-morpholine, N-ethyl-morpholine, N-cocomorpholine, N-cocomotpholinr, N,N,N',N'-tetramethyl-ethylene diamine, 1,4-diaza-bicyclo(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylene triamine, N,N dimethyl cyclohexylamine, N,N,N',N'-tetramethyl-1,3-butane diamine, N,N-dimethyl-β-phenyl ethylamine, 1,2-dimethyl imidazole or 2-methyl imidazole.

Suitable tertiary amine catalysts with hydrogen atoms which are reactive with isocyanate groups include, e.g., triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethylaminomethyl-tetramethyl-disiloxane.

Bases which contain nitrogen, such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Organic metal compounds may also be used as catalysts according to the invention, particularly organic tin compounds.

The organic tin compounds used are preferably tin-(II)salts of carboxylic acids such as tin(II)-acetate, tinII-octoate, tin (II)-ethyl hexoate and tin(II)-laurate and the dialkyl tin salts of carboxylic acids such as dibutyl tin diacetate, dibutyl tin dilaurate, dibutyl tin maleate or dioctyl tin diacetate.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g., on pages 96 to 102.

The cataltsts are generally used in any catalytic amount, preferably in a quantity up to 10 percent by weight, based on the quantity of polyisocyanate. It may be added to Component A.

Surface-active additives (emulsifiers and foam stabilizers) may also be used according to the invention. Suitable emulsifiers include, e.g., the sodium salts of ricinoleic sulphonates or of fatty acids or salts of fatty acids with amines such as oleic acid diethylamine or stearic acid diethanolamine. Alkali metal or ammonium salts of sulphonic acids, for example, dodecyl benzene sulphonic acid or dinaphthyl methane disulphonic acid or of fatty acids such as ricinoleic acid or of polymeric fatty acids may also be included as surface-active additives.

The foam stabilizers used are mainly water-soluble polyether siloxanes. These compounds generally have a polydimethyl siloxane group attached to a copolymer of ethylene oxide and propylene oxide. Foam stabilizers of this kind have been described, e.g., in U.S. Pat. No. 3,629,308.

Reaction retarders, e.g., substances which are acid in reaction such as hydrochloric acid or organic acid halides, cell regulators known, per se, as paraffins or fatty alcohols or dimethyl polysiloxanes, pigments, dyes, flame-retarding agents known, per se, such as tris-chloroethyl phosphate or ammonia phosphate and polyphosphate, stabilizers against aging and weathering, plasticizers, furgistatic and bacteriostatic substances and fillers such as barium sulphate, kieselguhr, carbon black or whiting may also be used according to the invention.

Other examples of surface-active additives, foam stabilizers, cell regulators, reaction retarders, stabilizers, flame-retarding substances, plasticizers, dyes, fillers and fungistatic and bacteriostatic substances which may also be used according to the invention and details concerning their use and mode of action have been described in Kunststoff-Handbuch, Volume VI, published by Vieweg and Hochtlen, Carl, Hanser-Verlag, Munich 1966, e.g., on pages 103 to 113.

Additives which even further improve the fire characteristics of these plastics are particularly important and therefore it is preferred to include them. Apart from the usual flame-retarding agents, these include, in particular, halogenated paraffins and inorganic salts of phosphoric acid.

Production of foams according to the invention is basically carried out by mixing the above-described reactants in one or several stages in a discontinuously or continuously operating mixing apparatus and then leaving the mixture to foam up and solidify, in most cases outside the mixing apparatus in molds or on suitable supports. The required reaction temperature of between about 0° C. and 200° C., preferably between 30° C. and 160° C., can be achieved either by preheating one or more of the reactants before the mixing process or by heating the mixing apparatus itself or by heating the reaction mixture after it has been prepared. One may, of course, also use combinations of these or other methods for adjusting the reaction temperature. In most cases, sufficient heat is evolved during the reaction to enable the reaction temperature to rise above 50° C. after onset of the reaction or of foaming.

The reactants may, however, also be reacted by the known one-step process, prepolymer process or simiprepolymer process, often using mechanical devices such as those described in U.S. Pat. No. 2,764,565. Details concerning apparatus which may also be used according to the invention have been described in Kunststoff-Handbuch, Volume VI, published by Vieweg and Hochtlen, Carl-Hanser-Verlag, Munich, 1966, e.g., on pages 121 to 205.

Exceptionally high-grade plastics are obtained by the process according to the invention if hardening is carried out at temperatures above 20° C., in particular, C-200° C. So much heat is liberated even without the external supply of heat, especially in combinations of polyisocyanates which contain 10–40 percent of NCO groups. Temperatures above 150° C. are easily reached in the interior of foam blocks.

If the quantity of heat evolved in the reaction between the components is not suffieient, mixing may easily be carried out at a higher temperature, e.g., between 40° C. and 100° C. In special cases, mixing may also be carried out above 100° C., up to about 150° C. under pressure, so that when the material is discharged from the apparatus, the release of pressure is accompanied by foaming.

If production of the foam is carried out at an elevated temperature, one may, of course, also use higher boiling blowing agents such as hexane, dichloroethane, trichloroethane, carbon tetrachloride or light petrol. On the other hand, the water contained in the mixture may take over the function of blowing agent.

Foams may also be produced with the aid of inert gases, particularly air. For example, one of the reactants may be foamed up with air and then mixed with the other components. Mixing of the components may also be achieved, e.g., with the aid of compressed air which results in the direct formation of a foam which then hardens when shaped.

For any given formulation of components, the properties of the foams obtained, e.g., their density in the moist state depends, to some extent, on the details of the mixing process such as the nature and speed of the stirrer, the form of the mixing chamber and the selected reaction temperature when foaming is started. This density may vary from about 0.005 to 1.2 $g/m^3$ and in most cases fresh foams with densities of between 0.02 and 0.8 $g/cm^3$ are obtained. When dry, the foams may have an open-celled or closed-celled character.

The characteristics of the reaction mixtures provide many possible applications for the process according to the invention and hence many fields of application, some of which will be outlined below.

The reaction mixture which contains blowing agent may, for example, br spread-coated on warm or cold supports or on supports exposed to IR or HF radiation, or after passing the mixing apparatus, the reaction mixture may be sprayed on these supports with the aid of compressed air or by the airless spraying process. The reaction mixture then foams up on the supports and hardens to form a filling or insulating or moisture-proofing coating. The foaming reaction mixture may also be forced, cast or injection-molded into cold or heated molds and in these molds, which may be relief molds, solid molds or hollow molds, it may be left to harden, optionally under pressure and at room temperature or temperatures of up to 200° C., optionally using a centrifugal casting process. At this stage, reinforcing elements in the form of inorganic and/or organic or metal wires, fibers, non-woven webs, foams, fabrics, supporting structures, etc., may be incorporated. This may be achieved, for example, by the fibrous web impregnation process or by processes in which the reaction mixtures and reinforcing fibers are together applied to the mold, for example by means of a spray apparatus. The molded products obtainable in this way may be used as building elements, e.g., in the form of optionally foamed sandwich elements which may be used directly or subsequently laminated with metal, glass, plastics, etc., the good fire characteristics of the material in the moist or dry state being a considerable advantage in these elements. On the other hand, the products may be used as hollow bodies, e.g., as containers for goods which are required to be kept moist or cool, or they may be used as filter materials or exchangers, as catalyst carriers or carriers of other active substances, as decoration elements, furniture components and cavity fillings. They may also be used as heavy-duty lubricants and coolants or carriers of such substances, e.g., in metal extrusion presses. Their use in model and mold building and in the production of molds for metal casting, may also be considered.

One preferred method consists of letting the foaming process proceed hand in hand with hardening, for example, by preparing the reaction mixture in a mixing chamber and at the same time, adding the readily volatile blowing agent such as dichlorodifluoromethane, trichlorofluoromethane, butane, isobutylene or vinyl chloride so that with suitable choice of the mixing temperature, the reaction mixture forms up on leaving the mixing chamber due to evaporation of the blowing agent and at the same time, hardens due to the action of the hardener so that the resulting foam, which may still contain emulsifiers and foam stabilizers and other auxiliary agents, becomes fixed. Furthermore, the reaction mixture which initially is still a thin liquid may be foamed up by introducing gases such as air, methane, CF4 or inert gases, optionally under pressure, this foam being converted into the required form and left to harden. Alternatively, the prepolymer solution which may contain foam stabilizers such as wetting agents, foam-forming agents, emulsifiers and, optionally, also other organic or inorganic fillers or diluents may be converted into a foam by gasifying it and this foam may then be mixed with the counter components in a mixing apparatus and, optionally, also with hardener and then left to harden.

Instead of blowing agents, inorganic or organic finely divided hollow particles such as hollow expanded beads of plastics, straw and the like may be used for producing the foams.

The foams obtainable in this way may be used optionally after a compating or tempering process, optionally uner pressure, as insulating materials, cavity fillings, packaging materials and building materials which have good solvent resistance and fire characteristics. They may also be used as light-weight building bricks in the form of sandwiches, e.g., with metal covering layers for use in house-building and the construction of motor vehicles and aircraft.

The reaction mixtures may also be foamed up and hardened while in the form of droplets dispersed, e.g., in petroleum hydrocarbons or while they are under conditions of free fall. Foam beads are obtained in this way.

Furthermore, organic and/or inorganic particles which are capable of foaming or have already been foamed, e.g., particles of expanded clay, blown glass, wood, popcorn, cork, hollow beads of plastics such as vinyl chloride polymers, polyethylene, styrene polymers or foam particles of these polymers or of other polymers such as polysulphone, polyepoxide, polyurethane, urea formaldehyde, phenol formaldehyde or polyimide polymers may be incorporated in the foaming reaction mixtures while they are still fluid, or heaps of these particles may be permeated with the reaction mixtures to produce insulating materials which have good fire characteristics.

If the blowing agent which is capable of evaporating or liberating gases below a given temperature, for example, a hydrocarbon or halogenated hydrocarbon, is added at this temperature to a mixture of sodium silicate powder and hardeners, optionally also containing inorganic and/or organic additives, then the resulting mixture may be used not only for producing uniform foams or foams which contain other foamed or unfoamed fillers, but also, for permeating woven and non-woven fibrous webs, grids, constructional parts or other permeable structures with foamed material to produce composite foams which have special properties, e.g., advantageous fire characteristics, which may be used directly as constructional elements in the building industry, furniture industry or motor vehicle and aircraft industries.

The foams according to the invention may also be added in a crumbly form to soil, optionally with the addition of fertilizers and plant-protective agents, to improve the agricultural consistency of the soil. Foams which have a high water content may be used as substratas for the propagation of seedlings, shoots and plants or for cut flowers. The mixtures may be sprayed on terrain which is impassible or too loose, such as dunes or marshes, to strengthen such terrain so that it will be firm enough to walk on within a short time and it will be protected against erosion.

Since the mixtures can easily be sprayed, they can be used to form effective protective walls and protective layers in mines in the case of accident or also for routine work, for example, by spraying the mixtures on fabrics or other surfaces or grids or also simply on walls.

In the same way, the foaming mixtures may also be used in underground surface engineering and road building, for erecting walls and igloos and for sealing, filling, plastering, priming, insulating and decorating and as coatings, flooring compositions and linings. Their use as adhesives or mortar or casting compounds, optionally with inorganic or organic fillers, may also be considered. They may be charged with active substances or used as catalyst carriers or filters or absorbents.

Auxiliary agents which may be added to the reaction mixture or introduced subsequently, such as emulsifiers, detergent raw materials, dispersing agents, wetting agents, perfumes or substances which render the mixture hydrophobic enable the properties of foams to be modified as desired.

On the other hand, the foams may subsequently be lacquered, metalized, coated, laminated, galvanized, vapor-treated, bonded or flocked. Forming operations may be carried out on the shaped articles in their aqueous or dried state, for example, by sawing, cutting, drilling, planing, polishing or other such processes.

The shaped products, with or without filler, may be further modified in their properties by thermal after-treatment, oxidation processes, heat-pressing, sintering processor or surface melting or other compacting processes.

The molds may suitably be made of inorganic and/or organic foamed or unfoamed material such as metals, e.g., iron, nickel, refined steel or lacquered or teflon-coated aluminum or porcelain, glass, gypsum, cement, wood or plastics such as PVC, polyethylene, epoxy resins, polyurethanes, ABS, polycarbonate, etc.

The foams obtained according to the invention may also be subsequently rinsed or impregnated with aqueous or non-aqueous acid, neutral or basic liquids or gases such as hydrochloric acid, phosphoric acid, formic acid, acetic acid, ammonia, amines, organic or inorganic salt solutions, lacquer solutions, solutions of monomers which have been polymerized or are yet to be polymerized, dye solutions, galvanization baths or solutions with catalysts or catalyst precursors or perfumes.

The new composite plastics are also suitable for use as constructional materials because they have a high tensile strength and compression resistance and are tough and stiff and yet elastic and have a high dimensional stability under heat and flame resistance.

The excellent heat-insulating and sound-absorbing capacity of these foams should also be emphasized, properties which in combination with the excellent fire resistance and heat resistance open up new possibilities of application in the insulating field.

Thus, for example, high-quality light-weight building panels can be produced, either by cutting or sawing continuously foamed blocks or by foaming such panels in molds, optionally under pressure, this molding process being particularly suitable also for complicated shapes. By suitably controlling the operating conditions, it is also possible to obtain molded products which have a dense outer skin.

The process according to the invention is particularly suitable, however, for in situ foaming on the building site. Any hollow molds normally produced by shuttering in forms can be obtained by casting and foaming.

Cavities, joints and cracks can also easily be filled with the reaction mixture, a very firm bond being obtained between the materials which are joined together in this way. The reaction mixtures may also be used to produce insulating indoor plasters simply by spraying.

In many cases, the materials obtained can be used instead of wood or hard fiber board. They can be worked by sawing, grinding, planing, nailing, drilling and cutting and are therefore versatile in their uses and possible applications.

Very brittle light-weight foams which can be obtained, e.g., with very high silicate contents or by using combinations with brittle organo-polymers, can easily be crushed in suitable apparatus to form dust-fine powders which can be used for many purposes as organo-modified silica fillers. The organo-modification insures good surface interaction with polymers and in some cases, also a certain surface thermoplasticity which enables high-quality molding materials to be obtained with which topochemical surface reactions can be carried out by the addition of crosslinking agents.

For many purposes, additional fillers in the form of particulate or pulverulent materials are incorporated in the mixtures of polyisocyanate, alkali metal silicate and organic component.

The fillers may be solid inorganic or organic substances used, e.g., in the form of powder, granulate, wire, fibers, dumb-bell-shaped particles, crystallites, spirals, rods, beads, hollow beads, foam particles, fleeces, woven or knitted fabrics, tapes, foil pieces, etc., for example, dolomite, chalk, clay, asbestos, basic silicic acids, sand, talcum, iron oxide, aluminum oxide and hydroxides, alkali metal silicates, zeolites, mixed silicates, calcium silicates, calcium sulphates, alumino silicates, cements, basalt wool or powder, glass fibers, carbon fibers, graphite, carbon black, Al-, Fe-, Cu- and Ag-powder, molybdenum sulphide, steel wool, bronze of copper fabrics, silicon powder, expanded clay particles, hollow glass beads, glass powder, lava and pumice particles, wood chips, wood meal, cork, cotton, straw, popcorn, coke and particles of filled or unfilled, foamed or unfoamed, stretched or unstretched organic polymers. Among the numerous suitable organic polymers, the following are mentioned as examples, which may be used, e.g., as powders, granulates, foam particles, beads, hollow beads, particles which can be foamed, but have not yet been foamed, fibers, tapes, woven and non-woven webs, etc., polystyrene, polyethylene, polypropylene, polyacrylonitrile, polybutadiene, polyisoprene, polytetrafluoroethylene, aliphatic and aromatic polyesters, malamine urea resins or phenol resins, polyacetal resins, polyepoxides, polyhydantoins, polyureas, polyethers, polyurethanes, polyimides, polyamides, polysulphones, polycarbonates and, of course, any copolymers thereof.

In principle, the composite materials according to the invention may be filled with considerable quantities of fillers without thereby losing their valuable properties. Composite material in which the inorganic component predominates are preferably filled with inorganic fillers to obtain a reinforcing effect while composite materials in which the silicate content predominates are preferably filled with organic fillers. Particularly preferred fillers are chalk, talcum, dolomite, gypsum, clay, anhydrite, glass, carbon and the usual plastics and rubber waste.

Products which have a low filler content are particularly suitable for producing rapidly hardening high-quality surface coatings which have excellent adherence and wear resistance and for producing elastomers with high strength and high modulus. The reactive mixture may be used for producing surface coatings, adhesive bonds, putties and interlayers.

For such applications, it is preferable to use polyisocyanates with a low isocyanate content, e.g., less than 5 percent. The mixtures obtained in this way have a long pot life and can also be applied in thin layers which gradually harden in the course of time.

The materials according to the invention are also suitable for use as finishes for treating fibers in impregnating agents. For this purpose they may be applied either as the finished mixture of organic component and silicate component or as two separate baths. It is, therefore, preferable first to apply that component which adheres more firmly to the fiber, in other words, the isocyanate component on organic material and the silicate component on inorganic material.

Furthermore, fibers and sheet structures which can be used, e.g., for manufacturing synthetic incombustible paper or for manufacturing non-woven webs may be produced by extruding the mixtures through dies or slots.

Any suitable modifying or additive compounds may be used in the reaction of this invention to vary properties of the product. Typical modifying compounds include polyepoxides, polysulfide polymers, alkali sulfides, aminoplasts, phenoplast, fatty or rosen acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, sodium lignin-cellulose, sodium cellulose, etc., and mixtures thereof.

The object of the present invention is to provide an improved process of producing poly(polyisocyanate-alkali metal silicate) products. Another object is to produce novel poly(polyisocyanate-alkali metal silicate) products Still another object is to produce poly(polyisocyanate-alkali metal silicate) products that may be used for thermal and sound insulation, structural purposes, shock-resistant packaging, cushions, surface coating, adhesives, casting material, putty, etc.

DESCRIPTION OF PREFERRED EMBODIMENTS

My invention will be illustrated in greater detail by specific examples which follow, it being understood that these preferred embodiments are illustrative of, but not limited to, procedures which may be used in the production of Poly(polyisocyanate-alkali metal silicate) products. Parts and percentages are by weight unless otherwise indicated.

EXAMPLE 1

About 10 parts by weight of powdered sodium silicate glass ($SiO_2$: NaO ratio 3.22) and 90 parts by weight of tolylene diisocyanate (TDI) are mixed and heated to 30° C. while agitating. The mixture reacts and turns to a solid poly(polyisocyanate-alkali silicate) pre-polymer.

EXAMPLE 2

The solid poly(polyisocyanate-alkali silicate) pre-polymer produced in Example 1 is pulverized into a powder and mixed with 25 parts by weight of a polypropylene triol, mol. wt. 3000, hydroxyl No. 56. The mixture reacts in a few minutes to produce a strong, tough, solid product.

EXAMPLE 3

Example 1 is modified wherein a polyisocyanate, selected from the list below, is used in place of the TDI:
(a) polymeric MDI (MONDUR MR by Mobay)
(b) polymeric MDI (PAPI 27 by Upjohn)
(c) 2,4--tolylene diisocyanate (MONDUR TDS by Mobay)
(d) Modified MDI (MONDUR CD by Mobay)
(e) Hexamethylene diisocyanate.

EXAMPLE 4

Example 2 is modified wherein 5 parts by weight of trichloromonofluoromethane, 0.5 parts by weight of a silicone surfactant (DOW 190 by DOW Chemical), 0.05 parts by weight of triethylamine are mixed with the polyol. The mixture reacts to produce a semi-rigid-to-rigid poly(polyisocyanate sodium silicate)foam of about 2–4 pounds per cubic foot.

EXAMPLE 5

About 30 parts by weight of a finely powdered sodium silicate glass with an $SiO_2$:NaO ratio of 3.22 passes through a 200-mesh screen; 30 parts by weight of tolylene diisocyanate (TDI) and 0.5 parts by weight of a silicone surfacant are mixed and the mixture is heated to about 30° C. while agitating; then the mixture expands to form a rigid foam of about 2-3 pounds/cu. ft.

EXAMPLE 6

Example 5 is modified wherein another sodium silicate with a different $SiO_2$:NaO ratio is used and the ratio is selected from the list below:
(a) 3.4:1;
(b) 4.0:1,
(c) 2.0:1;
(d) 1.5:1;
(e) 5.0:1;
(f) 6.0:1,
(g) 7.0:1;
(h) 8.0:1;
(i) 9.0:1;
(j) 10.0:1;
(k) 1:1.

EXAMPLE 7

Example 5 is modified wherein another polyisocyanate is used in place of TDI and selected from the list below:
(a) 2,4-tolylene diisocyanate (MONDUR TDS by Mobay);
(b) Polymeric MDI (MONDUR MR. by Mobay);
(c) Polymeric MDI (PAPI 27 by UPJOHN);
(d) Modified MDI (MONDUR CD by Mobay);
(e) hexamethylene diisocyanate;
(f) methylene diphenyl isocyanate;
(g) crude MDI by Upjohn) -NCO content 30.2 %;
(h) sulphonated polymethylene-polyisocyanate-NCO content 30%;
(i) Tolylene diisocyanate prepolymer containing 2% propylene glycol
(j) Tolylene diisocyanate - homopolymers of butadiene with an NCO content of 12% free NCO.

EXAMPLE 8

Example 5 is modified wherein 30 parts by weight of the sodium. silicate glass is changed to different parts by weight and selected from the list below:
(a) 10 parts by weight;
(b) 15 parts by weight;
(c) 20 parts by weight;
(d) 25 parts by weight;
(e) 35 parts by weight;
(f) 40 parts by weight;
(g) 60 parts by weight.

EXAMPLE 9

Example 5 is modified wherein the reaction is initiated at ambient temperature and pressure by a catalyst selected from the list below instead of heating the mixture:
(a) 0.1 parts by weight of tin octoate;
(b) 0.1 parts by weight of tin laurate;
(c) 0.1 parts by weight of dibutyl tin diacetate;
(d) 0.1 parts by weight of dibutyl tin maleate;
(e) 0.5 parts by weight of triethylamine;
(f) 0.5 parts by weight of tributyl amine;
(g) 0.5 parts by weight of tertiary amine (DABCO LV by Air Products);
(h) 0.5 parts by weight of tertiary amine (DABCO R8020 by Air Products;
(i) 1 part by weight of a tertiary amine (POLY CAT 41 by ABBOTT);
(j) mixtures of the above.

EXAMPLE 10

Example 5 is modified wherein 5 parts by weight of an organic compound which has an active hydrogen and is selected from the list of organic amphiphilous compounds listed below and added with the sodium silicate:

| | | | |
|---|---|---|---|
| (a) | methanol; | (n) | ethylene chlorohydrin; |
| (b) | ethanol; | (o) | acetonitrile; |
| (c) | allyl alcohol; | (p) | ethylene chloride; |
| (d) | phenol; | (q) | allyl chloride; |
| (e) | cresol; | (r) | acrylonitrile; |
| (f) | furfuryl alcohol; | (s) | nitropropane; |
| (g) | thiophenol; | (t) | malic acid; |
| (h) | acetaldehyde; | (u) | calcium propionate; |
| (i) | furfural; | (v) | p-toluene sulphonic acid; |
| (j) | acetone; | (w) | triethyl phosphate; |
| (k) | acetic acid; | (x) | acrolein; |
| (l) | benzoic acid; | (y) | cyclohexanol; |
| (m) | epichlorohydrin; | (z) | methacrylonitrile. |

EXAMPLE 11

Example 5 is modified wherein 30 parts by weight of an organic compound containing at least 2 active hydrogen atoms and selected from the list below:
(a) polypropylene triol, mol. wt. 3,000, hydroxyl No. 42;
(b) polypropylene triol, mol. wt. 3,500, hydroxyl No. 49;
(c) poly(oxyalkylene, mol. wt. 3,000, hydroxyl No. 58;
(d) polypropylene triol, mol. wt. 6,000, hydroxyl No. 36;
(e) polypropylene diol, mol. wt. 1,275, hydroxyl No. 88;
(f) polypropylene diol, mol. wt. 2,000, hydroxyl No. 78;
(g) polypropylene triol, viscosity 750, hydroxyl Nc. 620;
(h) polypropylene triol, viscosity 241, hydroxyl No. 168;
(i) sucrose polyether polyol, hydroxyl No. 380;
(j) sucrose amine polyol, hydroxyl No. 413;
(k) phenyl amine polyol, hydroxyl No. 350;
(l) poly(oxyalkylene) polyol, hydroxyl No. 380;
(m) polyester polyol, hydroxyl No. 275;
(n) aromatic polyester polyol, hydroxyl No. 405;
(o) chlorinated polyhydroxypolyether, hydroxyl No. 193;
(p) methyl glycoside-based polyol, hydroxyl No. 240;
(q) phenol-formaldehyde resin, hydroxyl No. 140;
(r) phenol formaldehyde resin with furfuryl alcohol and melamine, hydroxyl No. 140;
(s) urea-formaldehyde resin polyol, hydroxyl No. 120;
(t) sorbitol-based polyol, hydroxyl No. 490;
(u) polypropylene plyol with urea, hydroxyl No. 380;
(v) phosphorus-containing polyol (VIRCOL-82 by MOBIL), hydroxyl No. 205;
(w) hydroxyl-terminated homopolymer of butadiene, hydroxyl No. 46.6, mol. wt. 2,800 (Poly bd R-45 Ht by ARCO);
(x) Polyester resin, viscosity 8,000, hydroxyl No. 210;
(y) polyurea-filled polyol, viscosity 3,200, hydroxyl No. 28;
(z) mixtures of the above.

EXAMPLE 12

About 15 parts by weight of finely powdered sodium silicate (ratio $SiO_2:NaO$ 3.22:1), 20 parts by weight of polypropylene triol, mol. wt. 3,000, hydroxyl No. 42, 0.2 parts by weight of water, 0.2 parts by weight of silicone surfactant (DOW 190 by DOW) and 10 parts by weight of tolylene diisocyanate (TDI) are mixed at ambient temperature and pressure. The mixture slowly expands to produce a flexible poly(polyisocyanate-sodium silicate) foamed product of 1.5 to 2.5 pounds/cu. ft. The foam is strong, has good tear tesistance, and good rebound.

EXAMPLE 13

Example 12 is modified wherein 15 parts by weight of TDI are used instead of 10 parts by weight, thereby producing a strong semi rigid poly(polyisocyanate-sodium silicate) foamed product.

EXAMPLE 14

Example 12 is modified wherein equal parts by weight of the sodium silicate, polyol and TDI are used, thereby producing a tough, rigid poly(polyisocyanate-sodium silicate) foamed product of about 2-3 pounds/cu. ft.

EXAMPLE 15

Example 12 is modified wherein 5 parts by weight of trichloromonofluoromethane are added in place of the water.

EXAMPLE 16

Example 5 is modified wherein another alkali metal silicate, selected from the list below, is used in place of sodium silicate:
(a) Potassium silicate with $SiO_2:KO$ ratio of 4:1;
(b) Potassium silicate with $SiO_2:KO$ ratio of 5:1;
(c) Lithium silicate with $SiO_2:KO$ ratio of 3:1.

EXAMPLE 17

About 30 parts by weight of a finely powdered sodium silicate ($SiO_2:NaO$ ratio of 3:4), 10 parts by weight of polypropylene polyol with hydroxyl No. 380, 0.5 parts by weight of a silicone surfactant (DOW 193 by DOW) 15 parts by weight of styrene and parts by weight of tolylene diisocyanate (TDI) are mixed; in a few seconds the mixture expands to a strong, rigid poly(polyisocyanate-sodium-silicate-polystyrene) foam of about 2 pounds/sq.ft.

EXAMPLE 18

Example 17 is modified wherein another polymerizable unsaturated organic compound is used in place of styrene and a free radical is added when necessary:
(a) acrylonitrile;
(b) methyl methacrylate with 15% acrylic acid;
(c) vinyl acetate;
(d) chloroprene;
(e) vinyl pyridines;
(f) vinyl pyrrolidone;
(g) divinyl benzene;
(h) isoprene;
(i) unsaturated polyester resin;
(j) mixtures thereof.

EXAMPLE 19

Example 17 is modified wherein 10 parts by weight of a partiarlate or pulverulent are added to the components and selected from the list below:
(a) hollow silia cells (Q300 by PQ Corp.);
(b) powdered dolomite;
(c) powdered chalk;
(d) finely powdered alumium hydroxide;
(e) powdered fiberglass;
(f) powdered gypsum;
(g) powdered barium sulfate;
(h) powdered carbon black.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the Art upon reading my disclosure. These are intended to be included within the scope of my invention, as defined in the appended claims.

I claim:

1. The product obtained by mixing and reacting the following components:
   (A) finely powdered alkali metal silicate glass which contains no water, in the amount of 10 to 200 parts by weight;
   (B) organic polyisocyanate, in the amount of 50 to 100 parts by weight;
   (C) compound containing 1 or more active hydrogen atoms that will react with polyisocyanate compounds and selected from the group consisting of polyhydroxy organic compounds, water, monohydroxyl organic compounds, aldehydes, carboxylic acids, organic anhydrides, carboxylic acid chloride, organic esters, ethers, halomethyl compounds, ketones, organic nitro compounds, organic sulphonic acid, amino compounds, phenol-furfuryl alcohol polymers, sodium cellulose, sodium-lignin cellulose, furfuryl ketone polymer and mixtures thereof, in the amount of up to 300 percent by weight, based on weight of Components (A) and (B).

2. The product of claim 1 wherein the alkali metal silicate glass is selected from the group consisting of sodium silicate, potassium silicate, lithium silicate and mixtures thereof.

3. The product of claim 1 wherein up to 10 percent by weight of a catalyst, percentage being based on the weight of Component (A) and (B), is added to Component (A) and selected from the group consisting tertiary amines, organic-tin compounds and mixtures thereof.

4. The product of claim 1 wherein up to 20 percent by weight, based on the weight of components (A) and (B), of an emulsifying agent is added to Components (A) or (B) or mixtures of (A) and (B).

5. The product of claim 1 wherein up to 20 percent by weight, based on the weight of Components (A) and (B), of a foam stabilizer is added to Component (A), (B) or mixture of (A) and (B).

6. The product of claim 1 wherein up to 50 percent by weight, based on weight of Components (A) and (B), of a chemically inert blowing agent, boiling within the range of from 125° C. to 80° C., is added to Component (A), (B) or mixtures of (A) and (B).

7. The product of claim 1 wherein organic or inorganic particulate or pulverulent materials are added to the Components (A), (B) or mixture of (A) and (B).

8. The product of claim 1 wherein up to 20 percent by weight, based on weight of Components (A) and (B), of a salt-forming compound is added to Components (A), (B) or mixture of (A) and (B).

9. The product of claim 1 wherein Component (C) is a polyhydroxyl organic compound.

* * * * *